(12) United States Patent
Islam et al.

(10) Patent No.: US 7,474,090 B2
(45) Date of Patent: Jan. 6, 2009

(54) POSITION SENSOR AND ASSEMBLY

(75) Inventors: Mohammad S. Islam, Saginaw, MI (US); Matthew Mielke, Saginaw, MI (US); Tomy Sebastian, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/877,291

(22) Filed: Oct. 23, 2007

(65) Prior Publication Data

US 2008/0048650 A1 Feb. 28, 2008

Related U.S. Application Data

(62) Division of application No. 10/971,440, filed on Oct. 22, 2004, now Pat. No. 7,307,416.

(51) Int. Cl.
*G01B 7/30* (2006.01)
*G01R 33/06* (2006.01)
*H01L 43/06* (2006.01)

(52) U.S. Cl. .................. 324/207.25; 324/207.2
(58) Field of Classification Search ............ 324/207.11, 324/207.2, 207.21, 207.22, 207.23, 207.25, 324/244, 247, 252
See application file for complete search history.

(56) References Cited

U.S. PATENT DOCUMENTS

| 4,642,496 | A | * | 2/1987 | Kerviel et al. | ............ 310/68 B |
|---|---|---|---|---|---|
| 6,288,533 | B1 | * | 9/2001 | Haeberli et al. | .......... 324/207.2 |
| 6,452,383 | B1 | | 9/2002 | Goedecke | |
| 6,489,761 | B1 | | 12/2002 | Schroeder et al. | |
| 6,498,409 | B1 | | 12/2002 | Collier-Hallman et al. | |
| 6,510,396 | B1 | | 1/2003 | Colosky | |
| 6,538,429 | B2 | | 3/2003 | Schroeder et al. | |
| 6,614,223 | B2 | | 9/2003 | Schroeder et al. | |
| 6,713,921 | B2 | | 3/2004 | Sebastian et al. | |
| 6,720,763 | B1 | | 4/2004 | Nehl et al. | |
| 6,721,629 | B2 | | 4/2004 | Wendling et al. | |
| 7,032,617 | B2 | * | 4/2006 | Kurita et al. | ................ 137/554 |
| 7,049,808 | B2 | * | 5/2006 | Martinez et al. | ....... 324/207.25 |
| 2002/0171416 | A1 | | 11/2002 | Schroeder | |
| 2003/0218458 | A1 | | 11/2003 | Seger et al. | |
| 2003/0230947 | A1 | | 12/2003 | Islam et al. | |
| 2004/0112146 | A1 | | 6/2004 | Islam et al. | |
| 2004/0112147 | A1 | | 6/2004 | Mir et al. | |

FOREIGN PATENT DOCUMENTS

JP 04-126512 * 5/1993 ............ 324/207.25

OTHER PUBLICATIONS

Dennis D. Berkley. CALCULUS, 2nd Edition, 1988, Saunders College Publishing, pp. 142-145.

* cited by examiner

*Primary Examiner*—Kenneth J Whittington
(74) *Attorney, Agent, or Firm*—Thomas N. Twomey

(57) ABSTRACT

A position sensor assembly including a circular-shaped or rhombus-shaped magnet and at least one magnetic flux density sensor, such as a Hall effect sensor, wherein rotation of the magnet is detected by the at least one sensor. The magnet may be positioned coaxially with the longitudinal axis of a rotor shaft of a motor and provided within a support. A position extraction algorithm may be employed using the output from the sensors to detect the position of the rotor shaft.

12 Claims, 8 Drawing Sheets

POSITION SENSOR AND ASSEMBLY

CROSS REFERENCE TO RELATED APPLICATIONS

This application is a divisional application of U.S. patent application Ser. No. 10/971,440, the contents of which are incorporated herein in their entirety.

BACKGROUND

This invention relates generally to a position sensor, and more particularly, this invention relates to an improved and low-cost high resolution position sensor.

Position sensors with digital outputs provide discrete position information only whereas an analog position sensor can provide both position information and outputs that can be used to drive an electric motor or other similar electromechanical devices. Many of these devices are driven by sinusoidal excitations as a function of position. Consequently, an analog position sensor having an output that varies sinusoidally with position could be used to generate absolute angular positions as, for example, an electrical power steering system to measure the angle of rotation of the steering wheel, and/or reference signals to produce the desired sinusoidal phase drive currents and voltages to drive electric motors and other similar electro-mechanical devices.

Applications may further include throttle position sensors, pedal position sensors in drive-by-wire systems, body height position sensors for automotive suspension systems, etc.

The operational principle of an angle encoder sensor is based upon the property of Hall plates and semiconductor magnetoresistors, collectively referred to herein as magnetosensitive devices, to sense only the normal component of the magnetic field passing through them. Consequently, if a constant and uniform magnetic field is rotated in the plane perpendicular to the surface of a magnetosensitive device, the output signal will vary as the cosine of the angle between the direction of the incident magnetic field lines and the line normal to the surface of the device. Alternatively, Hall effect sensors may be usable when the magnetic field line changes in output and is not constant.

Prior motor shaft position sensors have utilized a series of high resolution and low resolution magnets arranged in a ring-shaped fashion, with a number of Hall sensors for both the high resolution and low resolution magnets. A back iron plate is also often used to hold the magnets. This arrangement may have limited resolution capability.

BRIEF SUMMARY

Disclosed herein, in an exemplary embodiment, is a position sensor assembly including a rhombus-shaped magnet and at least one magnetic flux density sensor, wherein rotation of the rhombus-shaped magnet is detected by the at least one magnetic flux density sensor.

Also disclosed herein, in another exemplary embodiment, is a motor position sensor assembly including a rotor shaft of a motor, the shaft having a longitudinal axis, a rhombus-shaped magnet positioned coaxially with the longitudinal axis of the shaft, wherein the rhombus-shaped magnet is rotatable with the shaft, and at least one magnetic flux density sensor, wherein rotation of the rhombus-shaped magnet is detected by the at least one magnetic flux density sensor.

Also disclosed herein, in another exemplary embodiment, is a position sensor assembly for detecting rotation of a rotating body, the rotating body having a longitudinal axis, the position sensor assembly including a magnet positioned coaxially with the longitudinal axis of the rotating body, wherein the magnet is rotatable with the rotating body, a plurality of Hall sensors positioned at equal distances from a center of the magnet, wherein rotation of the magnet is detected by the plurality of Hall sensors and a support surrounding an end of the rotating body and for holding the magnet to the rotating body. The support may include a cup shaped portion for holding the magnet, wherein the Hall sensors are located exteriorly of the cup shaped portion.

Further disclosed herein, in yet another exemplary embodiment, is a position sensor assembly including a cylindrically-shaped magnet, two Hall effect sensors positioned 90 degrees apart from each other and positioned equidistantly from the magnet. Position information may be extracted using an algorithm as follows:

$$f(\theta,\phi) = A\cos\phi - B\sin\phi$$

$$f'(\theta,\phi) = -A\sin\phi - B\cos\phi$$

where $A = B_m \sin\theta$ and $B = B_m \cos\theta$, A and B are the signals obtained from the magnetosensitive Hall effect sensors, $\theta$ is position in mechanical degrees, and $B_m$ is the amplitude of the signals. Starting with an initial guess of the position as $\phi$, the operating equation for the estimated position using the Newton Raphson method may be written as:

$$\phi_{new} = \phi_{old} - f(\theta,\phi)/f'(\theta,\phi).$$

BRIEF DESCRIPTION OF THE DRAWINGS

The embodiments will now be described, by way of an example, with references to the accompanying drawings, wherein like elements are numbered alike in the several figures in which.

DETAILED DESCRIPTION OF EXEMPLARY EMBODIMENTS

Figure 1:
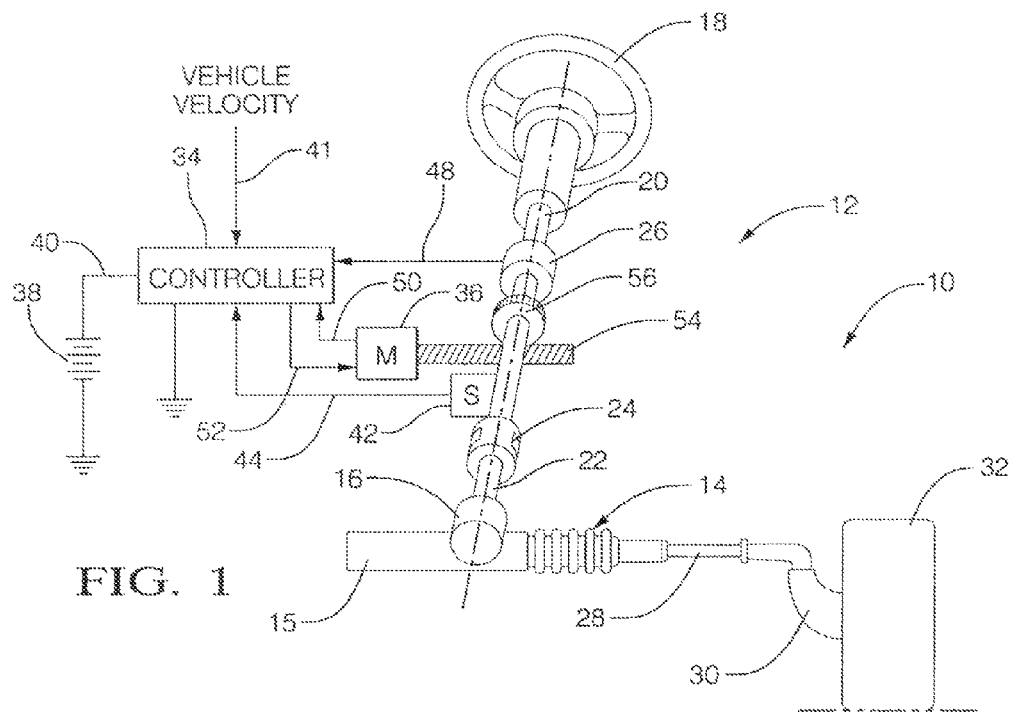
FIG. 1 is an electric power steering system employing an exemplary embodiment.

Referring to FIG. 1, an exemplary system for utilizing the position sensor is shown. While one such system is described herein for incorporating the position sensor, it should be understood that the position sensor disclosed herein may be used in alternate applications, and should not be limited to applications involving motors. As shown in FIG. 1, a motor vehicle 10 may be provided with an electric power steering system 12. Electric power steering system 12 may include a conventional rack and pinion steering mechanism 14 having a toothed rack 15 and a pinion gear (not shown) under a gear housing 16. As steering wheel 18 is turned, an upper steering shaft 20 turns a lower shaft 22 through a universal joint 24. Lower steering shaft 22 turns the pinion gear. The rotation of the pinion gear moves the pinion rack 15, which then moves tie rods 28 (only one shown). In turn, tie rods 28 move steering knuckles 30 (only one shown) to turn wheels 32 (only one shown).

An electric power assist may be provided through a controller 34 and a power assist actuator comprising a motor 36. Controller 34 receives electric power from a vehicle electric power source 38 through a line 40. The controller 34 may also receive a signal representative of the vehicle velocity on line 41, as well as steering pinion gear angle from a rotational position sensor 42 on line 44. As steering wheel 18 is turned, a torque sensor 46 senses the torque applied to steering wheel 18 by the vehicle operator and provides an operator torque signal to controller 34 on line 48. In addition, as the rotor of motor 36 turns, rotor position signals for each phase may be generated within motor 36 and provided over bus to controller 34. In response to signals such as, but not limited to, vehicle velocity, operator torque, steering pinion gear angle and rotor position signals received, the controller 34 derives desired motor phase currents. The motor phase currents may then be provided to motor 36 through a bus 52 to motor 36, which thereby provides torque assist to steering shaft 20 through worm 54 and worm gear 56.

Figure 2:
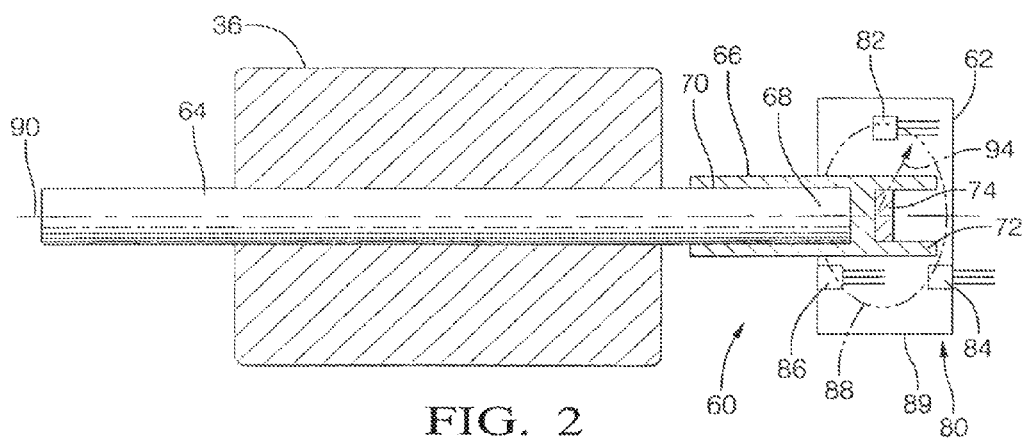
FIG. 2 is a diagrammatic view of a motor using a position sensor assembly in an exemplary embodiment.

Referring now to FIG. 2, the motor 36 of the electric power steering system 12 is shown. While a position sensor assembly 62 is shown in combination with the motor 36, it should be understood that the position sensor assembly 62 may be used in alternate applications not related to motor 36 and that its combination with motor 36 is demonstrated for exemplary purposes. Motor 36 features a rotor assembly 60 and an exemplary position sensor assembly 62. The rotor assembly 60 includes a rotatable shaft 64 passing through the motor 36. A support member 66 may be positioned along a same longitudinal axis 90 as the shaft 64, and may be securely mounted concentrically about an end 68 of the shaft 64. The end 68 would be opposite the end of the shaft 64 that is connected to the worm 54 within FIG. 1. The support member 66 may include a first end 70 for surrounding the end 68 of the shaft 64, and a second end 72 for supporting a rhombus (diamond-shaped) magnet 74 therein. The first end 70 and the second end 72 of the support member 66 may each be appropriately cup shaped for receiving the shaft end 68 and the rhombus magnet 74 therein, respectively.

Figure 3:
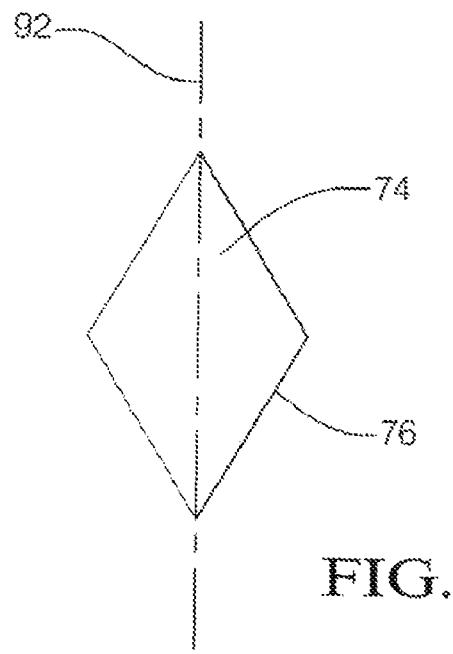
FIG. 3 is a top view of a magnet usable in the motor assembly of FIG. 2.

As further shown in FIG. 3, the rhombus magnet 74 includes a rhombus-shaped, or diamond-shaped, perimeter 76. It has been found that a rhombus including interior pairs of angles of approximately 64° and 116° functions particularly well as a position sensor, however it would be within the scope of these embodiments to utilize interior pairs of angles of approximately 40° and 140°, and of approximately 85° and 95°, as well as any angles within the range of 40° to 85° and the range of 140° to 95°. It should be understood that these angles are exemplary only, and depending on the particular needs of the position sensor, it would also be within the scope of the rhombus magnet to have angles outside of these described ranges.

Figure 4:
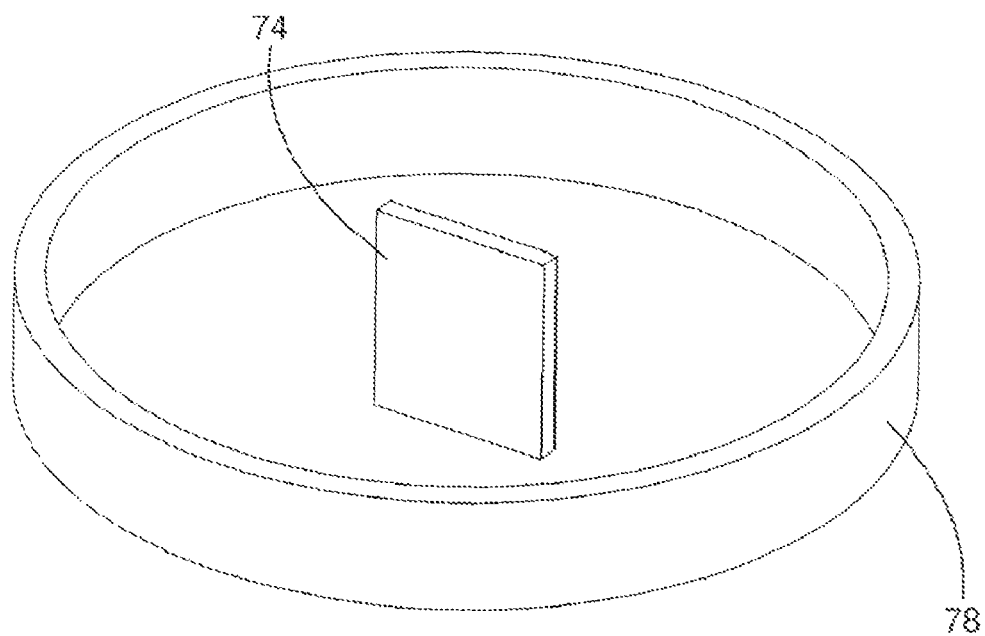
FIG. 4 is a perspective view of the magnet in FIG. 3 and a circular shield.

As shown in FIG. 4, the rhombus magnet 74 may be positioned at the center, or at least along the same longitudinal axis, of an optional circular magnetic shield 78. The circular magnetic shield 78 may be cylindrically-shaped, where a cross-section of a portion of the cylindrical shape of the shield 78 may be rectangular. The shield 78 may protect the position sensor from influences outside the area of concern. Thus, the shield 78 may be positioned outside of the support member 66 and on a circuit board holding Hall sensors as will be further described.

In addition to the rhombus magnet 74, the position sensor assembly 62 may further include a circuit board 89 holding three Hall sensors 80 that are 120 degrees apart in space. Information from the Hall sensors 80 may be sent to a microprocessor or controller, such as controller 34 for processing the output. As shown in FIG. 2, the sensors 80 are exemplarily identified as Hall-A 82, Hall-B 84, and Hall-C 86 and are arranged 120 degrees apart in space as exemplified by the imaginary circle depicted by dashed lines 88 surrounding the support member 66. That is, the sensors 80 are equidistantly spaced from a center of the rhombus magnet 74. It should be understood that although FIG. 2 is depicting a side view of a motor 36, shaft 64, and support member 66, the sensors 80 and circuit board 89 are shown arranged in a perspective-type view such that the arrangement of sensors 80 can be demonstrated. The circuit board 89 may be positioned perpendicularly to the shaft axis 90 at a position exterior of the support member 66. The circuit board 89 is stationary with respect to movement of the shaft 64, and may be molded within a housing of the mechanism within which it is being employed. Thus, the sensors 80 and shield 78 that are positioned upon the circuit board 89 may also be stationary.

The rhombus magnet 74 may be magnetized through its major axis 92. The shape and the magnetization pattern result in approximately triangular flux density variation around a circle, e.g. circle 88, at a certain radius, indicated by dashed line 94, from the axis 90 of the shaft 64. Changing the measurement radius 94 of the Hall sensors 80 along with the measurement component may change the waveform to sinusoidal also. Depending on the implementation algorithm either triangular or sinusoidal waveform may be used.

Figure 5:
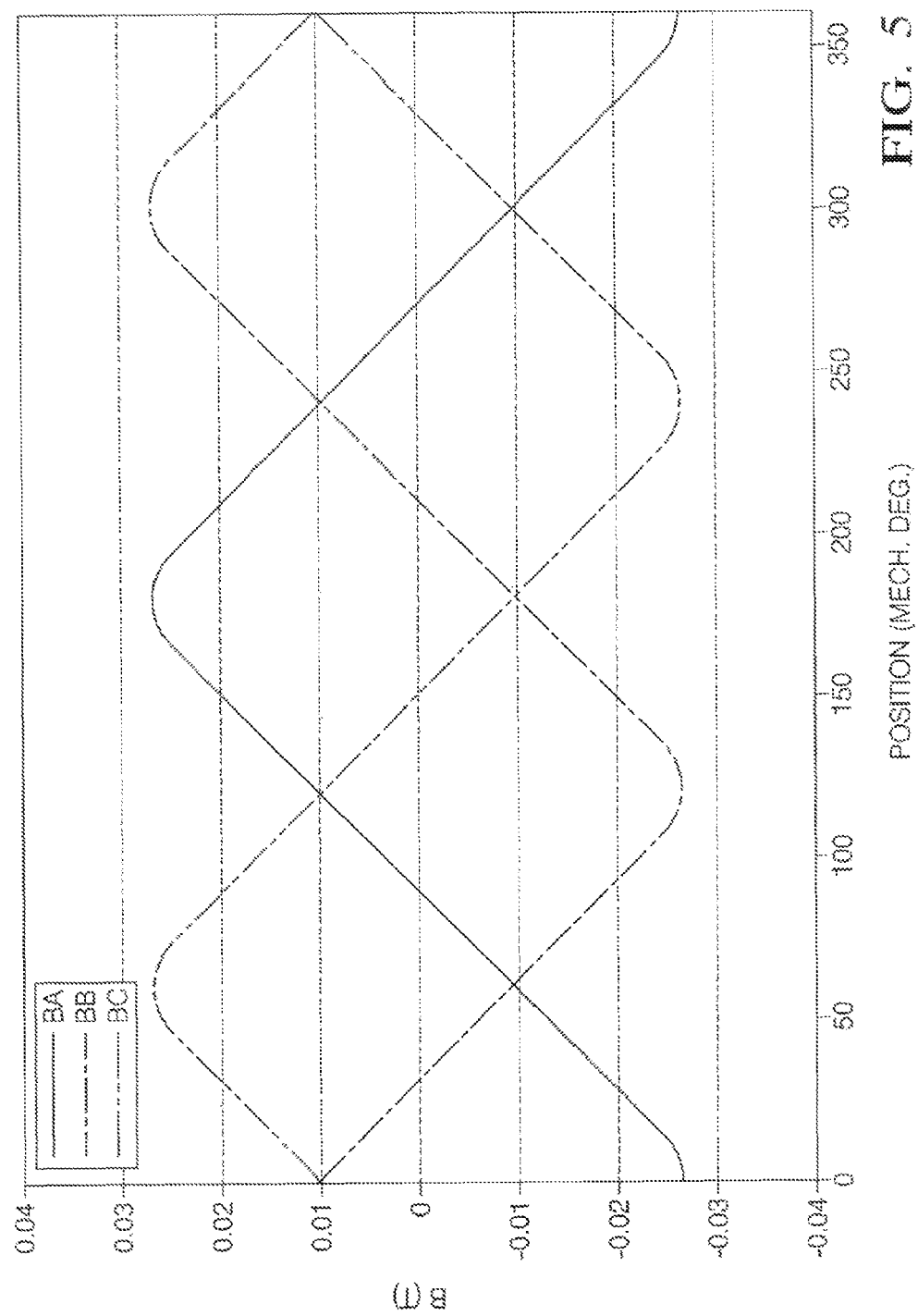
FIG. 5 is plot of the Hall sensor input signal of position in mechanical degrees vs. flux density.

As described above, three Hall effect sensors 80, which are 120 degrees apart in space, are placed along the circle of interest 88. The typical outputs from the Hall sensors 80 for this particular embodiment are shown in FIG. 5 as shown by plotting the position in mechanical degrees versus the flux density B(T), where B is the magnetic flux density in Teslas (T). These analytical results are from finite element analysis simulation. These will be converted to analog voltage by the Hall effect sensors 80. The rotor position may be determined by processing the outputs of the Hall sensors 80. This configuration can also be used for replacing the dual triangular waveform sensor using two Hall sensors having 90 degrees phase shifted.

The following table shows the algorithm for extracting the position information by measuring the output signals from the Hall sensors 80. The algorithm uses different signals, based on their sign, at different intervals as shown in the table.

| Rotor Position Extraction Algorithm | | | | |
|---|---|---|---|---|
| Range | A | B | C | θ (deg) |
| 0-60 | + | − | + | $\frac{60 V_A}{V_C + V_A}$ |

-continued

Rotor Position Extraction Algorithm

| Range | A | B | C | θ (deg) |
|---|---|---|---|---|
| 60-120 | + | − | − | $\dfrac{60(V_B + 2V_C)}{V_B + V_C}$ |
| 120-180 | + | + | − | $\dfrac{60(2V_A + 3V_B)}{V_A + V_B}$ |
| 180-240 | − | + | − | $\dfrac{60(3V_C + 4V_A)}{V_C + V_A}$ |
| 240-300 | − | + | + | $\dfrac{60(4V_B + 5V_C)}{V_B + V_C}$ |
| 300-360 | − | − | + | $\dfrac{60(5V_A + 6V_B)}{V_A + V_B}$ |

No temperature compensation is needed, as the position extraction algorithm cancels out the temperature effect.

In each 60 degrees interval, the absolute value of the redundant signal (not used for position estimation) should always be greater than or equal to the summation of the absolute value of the working signals. For example, in the 0-60 degrees interval, $V_B$ is the redundant signal and $V_C$ and $V_A$ are the working signals, in the 60-120 degrees interval. $V_A$ is the redundant signal and $V_B$ and $V_C$ are the working signals, in the 120-180 degrees interval, $V_C$ is the redundant signal and $V_A$ and $V_B$ are the working signals, in the 180-240 degrees interval, $V_B$ is the redundant signal and $V_C$ and $V_A$ are the working signals, in the 240-300 degrees interval, $V_A$ is the redundant signal and $V_B$ and $V_C$ are the working signals, and in the 300-360 degrees interval, $V_C$ is the redundant signal and $V_A$ and $V_B$ are the working signals. Hence, under healthy conditions (no faults, normal operating conditions), the following conditions (by example, within the range of 0-60 degrees) should be satisfied:

$$abs(V_B - V_{off}) \geq abs(V_C - V_{off}) + abs(V_A - V_{off})$$

where $V_{off} = V_{off} = V_{offset} = V_{CC}/2$ = the voltage output of the Hall sensors when there is no magnetic field.

Figure 6:
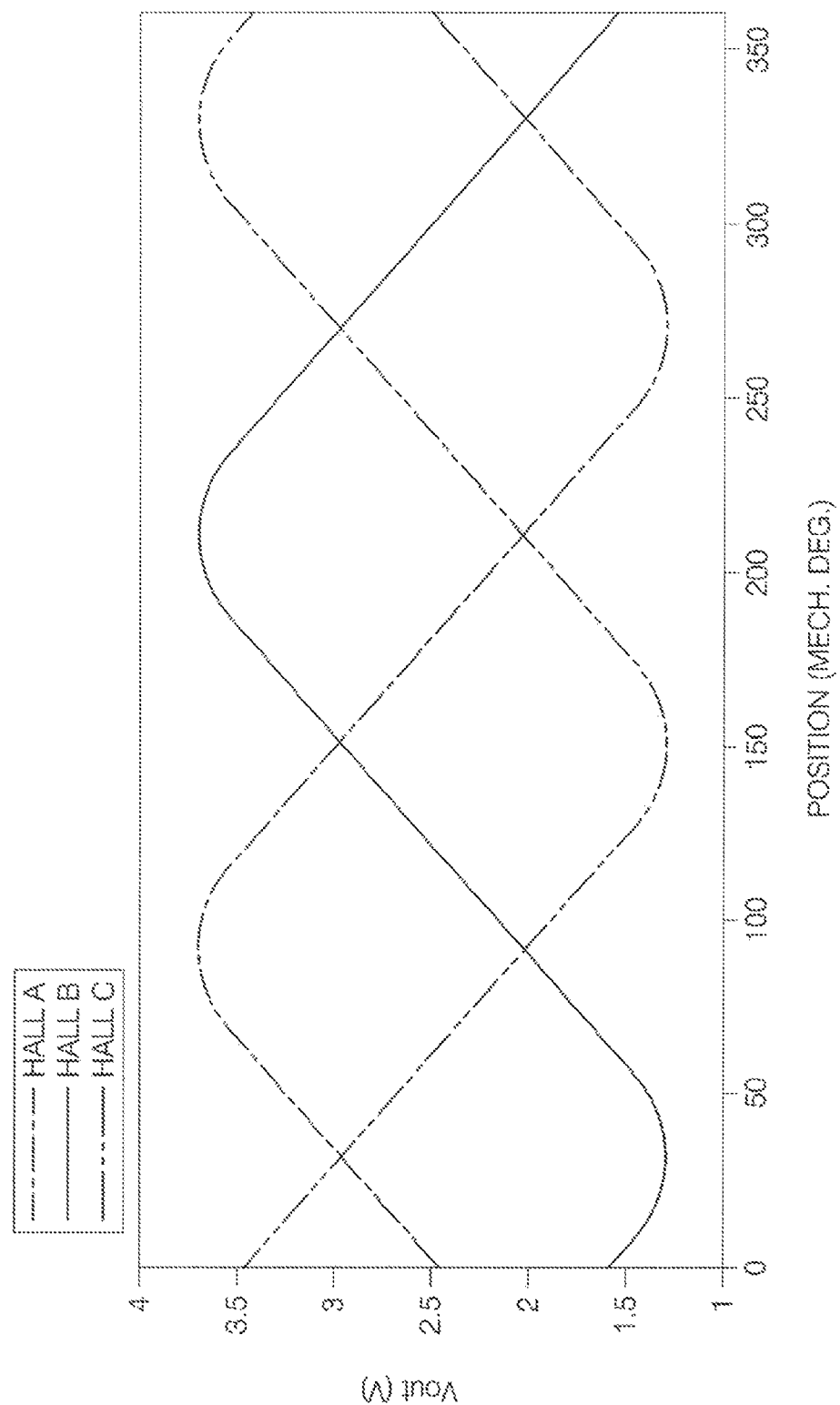
FIG. 6 is a plot of an actual position sensor in terms of position in mechanical degrees vs. $V_{out}$.

FIG. 6 shows test results. FIG. 6 shows the Hall sensor signals plotted as position (mechanical degree) versus voltage (V).

Figure 7:
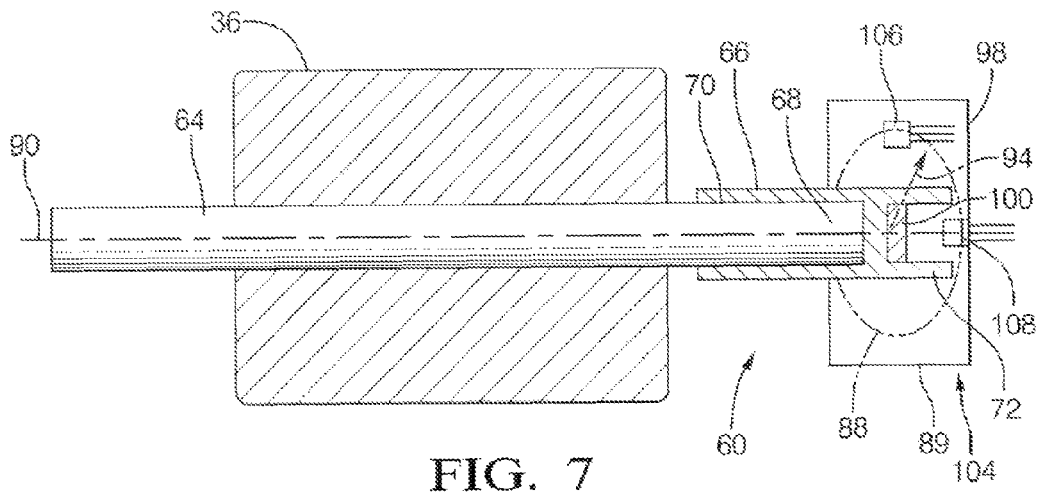
FIG. 7 is a diagrammatic view of a motor using a position sensor assembly in another exemplary embodiment.

Referring now to FIG. 7, motor 36 features a rotor assembly 60 and a position sensor assembly 99. While a position sensor assembly 98 is shown in combination with the motor 36, it should be understood that the position sensor assembly 98 may be used in alternate applications not related to motor 36 and that its combination with motor 36 is demonstrated for exemplary purposes. The rotor assembly 60 includes a rotatable shaft 64 passing through the motor 36. A support member 66 may be positioned along a same longitudinal axis 90 as the shaft 64, and may be securely mounted concentrically about an end 68 of the shaft 64. The support member 66 may include a first end 70 for surrounding the end 68 of the shaft 64, and a second end 72 for supporting a disk shaped or ring shaped (both circular and cylindrically shaped) magnet 100 therein. The embodiment will First be described with respect to a disk shaped magnet, that is, one without a central aperture, although it should be understood that a ring shaped magnet would also possess many of the same characteristics as the disk shaped magnet. The first end 70 and the second end 72 of the support member 66 may each be appropriately cup shaped for receiving the shaft end 68 and the disk shaped magnet 100 therein, respectively.

Figure 8:
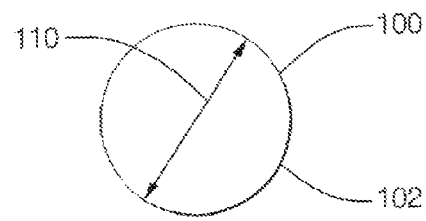
FIG. 8 is a top view of the magnet used in the motor assembly of FIG. 7.
Figure 9:
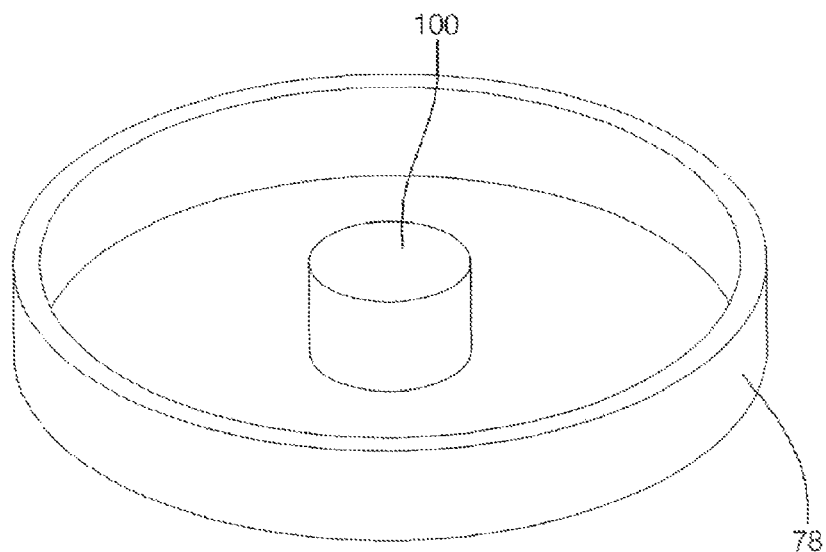
FIG. 9 is a perspective view of the magnet of FIG. 8 and a circular shield.

As further shown in FIG. 8, the disk magnet 100 includes a circular-shaped perimeter 102. As shown in FIG. 9, the disk magnet 100 may be positioned at the center, or at least along the same longitudinal axis, of a circular magnetic shield 78. The circular magnetic shield 78 may be cylindrically-shaped, where a cross-section of a portion of the cylindrical shape of the shield 78 may be rectangular. The shield 78 may be positioned on a circuit board 89 adjacent the second end 72 of the support member 66.

In addition to the disk magnet 100, the position sensor assembly 98 may further include a circuit board 89 holding two Hall sensors 104 that are 90 degrees apart in space. Information from the Hall sensors 104 may be sent to a microprocessor or controller, such as controller 34 for processing the output. As shown in FIG. 7, the sensors 104 are exemplarily identified as Hall-A 106 and Hall-B 108 and are arranged 90 degrees apart in space as exemplified by the imaginary circle depicted by dashed lines 88 surrounding the support member 66. A plane of the circuit board 89 may be positioned perpendicularly to the longitudinal axis 90 of the shall 64. Thus, in one embodiment, the circuit board 89 holding the Hall sensors 104 need not be coplanar with the magnet 100. The shield 78 and Hall sensors 104 are thus held stationary with the circuit board 89 while the magnet 100 rotates within close proximity. The circuit board 89 may be positioned such that it is not in danger of being bumped from the rotating magnet 100 (and shaft 64).

Figure 10:
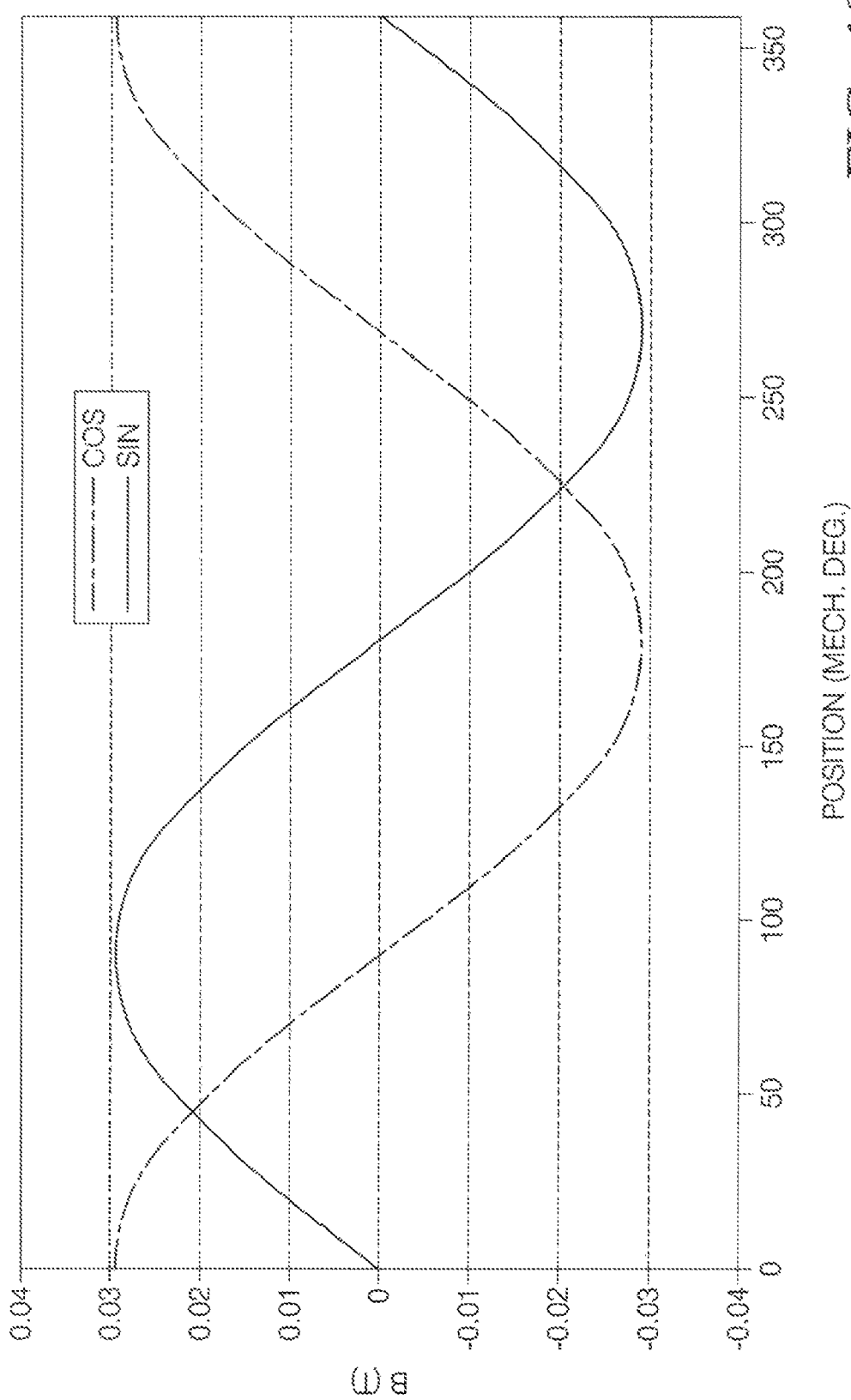
FIG. 10 is a theoretical plot of Hall sensor input signal as position in mechanical degrees vs. flux density output for the position sensor assembly of FIG. 7.

The disk magnet 100 may be magnetized through its diameter 110. The shape and the magnetization pattern result in sinusoidal flux density variation at a certain radius, indicated by dashed line 94, from the axis 90 of the shall 64. As described above, two Hall effect sensors 104, 90 degrees apart in space, are placed along the circle of interest 88. The typical outputs from the Hall sensors 80 for this particular embodiment are shown in FIG. 10. FIG. 10 shows, theoretically, the Hall sensors input signal, position in mechanical degrees plotted vs. flux density output. These will be converted to analog voltage by the Hall effect sensors 104, such as when employing linear Hall effect sensors. The rotor position may be determined by processing the outputs of the Hall sensors 104.

For a position extraction algorithm, one may start with a guess value of the position angle φ. (θ, position in mechanical degrees, is the actual position or sensor output, and φ, position angle, starts out as a guess, but otherwise meant to represent the same measurement as θ). Then, the following formulae may be written:

$$f(\theta, \phi) = B_m \sin(\theta - \phi) = B_m \sin\theta \cos\phi - B_m \cos\theta \sin\phi = A \cos\phi - B \sin\phi$$

$$f'(\theta, \phi) = -A \sin\phi - B \cos\phi$$

where A and B are known from the sampled waveforms, that is, $A = B_m \sin\theta$ and $B = B_m \cos\theta$. That is, θ is position in mechanical degrees, A and B are the signals obtained from the magnetosensitive device/Hall effect sensors, and $B_m$ is the amplitude of the signals. The updating equation for φ using Newton-Raphson method may be written as $$\phi_{new} = \phi_{old} - f(\theta, \phi)/f'(\theta, \phi)$$

When φ converges to the given tolerance, then it is the actual value of position θ. That is, φ=θ within a tolerance range.

No temperature compensation is needed since both signals are affected and will be varying simultaneously with temperature.

It may be noted that for diagnostics, $B_m^2 \sin^2 \theta + B_m^2 \cos^2 \theta = B_m^2$. By diagnostics, it is meant that if something goes wrong, it does not satisfy this condition. Thus, this equation is one way of detecting if there is a fault.

Figure 11:
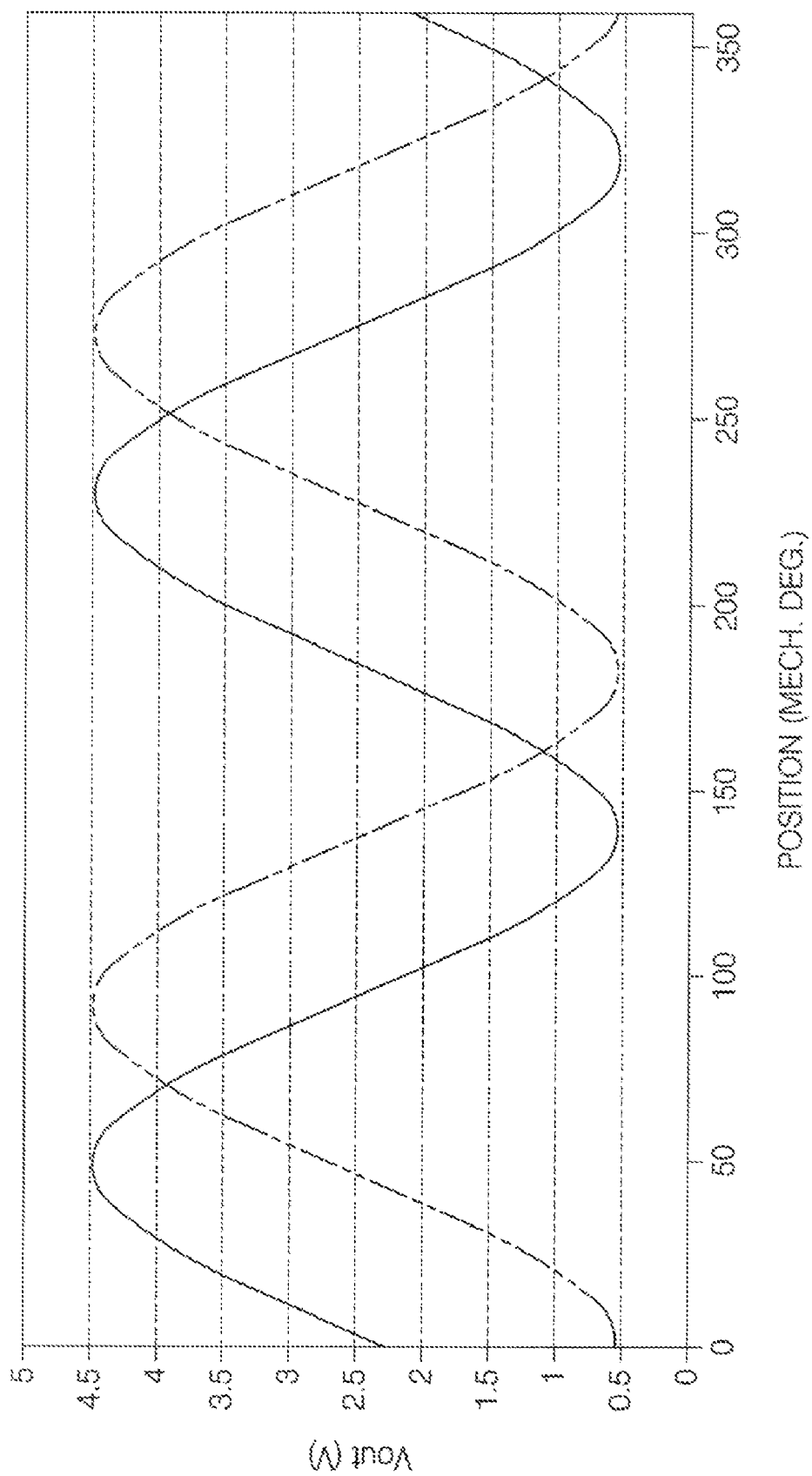
FIG. 11 is an output plot for an exemplary magnet plotting position in mechanical degrees vs. $V_{out}$.
Figure 12:
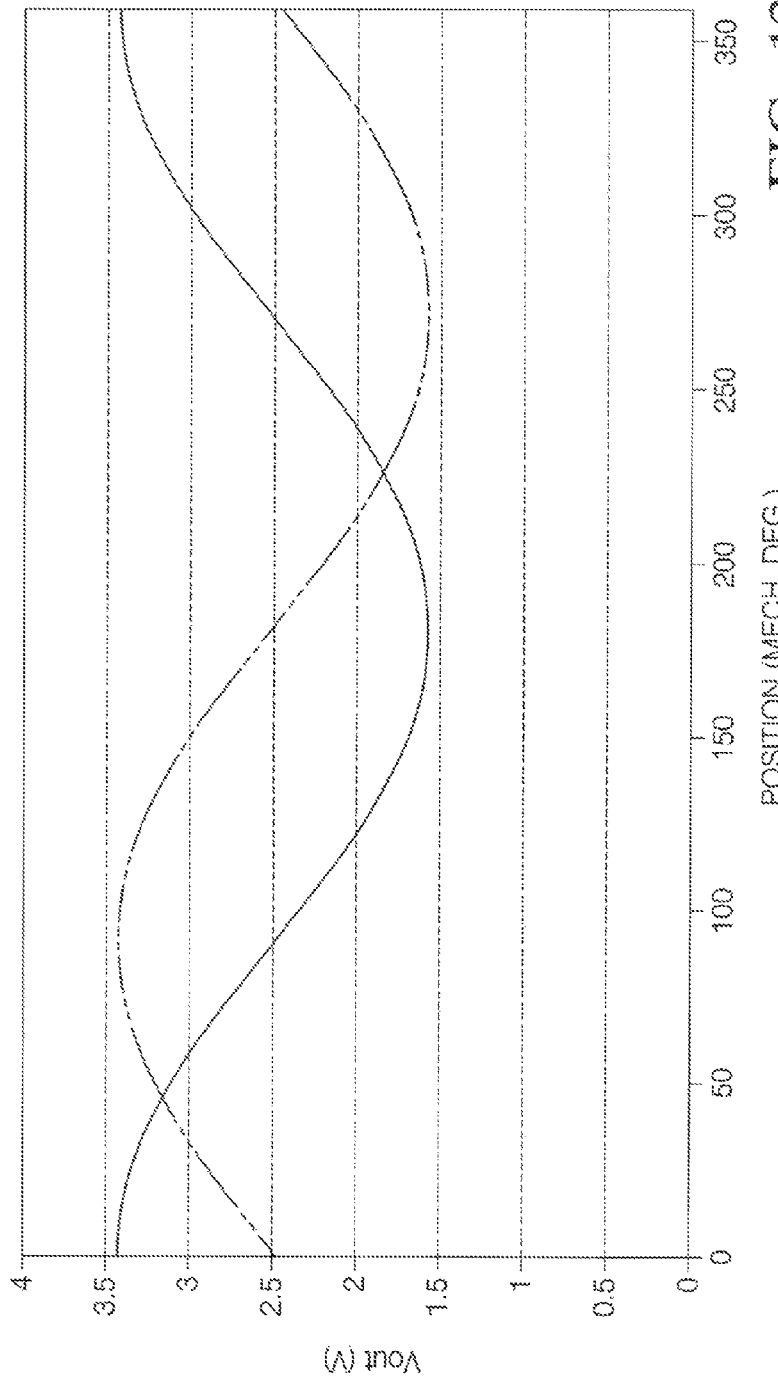
FIG. 12 is an output plot for another exemplary magnet plotting position in mechanical degrees vs. $V_{out}$; and, FIG. 13 is a top view of another exemplary magnet for use in the motor assembly of FIG. 7.

Test results of two cylindrical disks, such as disc 100, within a position sensor system, such as system 98 are preformed. The dimensions of the disks are 6 mm×4 mm and 5 mm×3 mm, respectively. FIGS. 11 and 12 show the output of the Hall sensors located 90 degrees apart for the 6×4 mm disc and 5×3 mm disc, respectively. Of course, other size disks may be employed in the position sensor assembly 98. The specific disk sizes described herein are for example only and not meant to limit the scope of the position sensor assembly 98.

Figure 13:
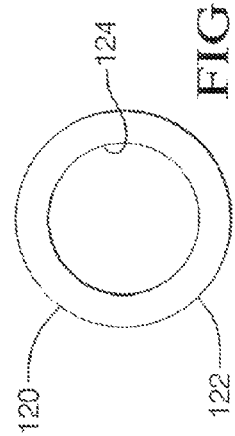

Turning now to FIG. 13, a ring-shaped magnet 120 is shown having an outer perimeter 122 and an inner perimeter 124. The calculation described above for the circular magnet 100 would be the same for a ring-shaped magnet. Thus, a position sensor assembly has been described that may use a cylindrically shaped magnet, wherein the cylindrically shaped magnet may either be solid (e.g. disc magnet 100) or have a central aperture (e.g. ring shaped magnet 120).

Thus, a low-cost position sensor assembly has been described. The position sensor may utilize a one-piece, integral magnet that is magnetized across its largest width, that is., a diameter for a cylindrical magnet and along the major axis for a rhombus magnet. A circular magnetic shield may encircle the magnet. A position extraction algorithm has been described for both types of magnets that utilizes information from the Hall effect sensors positioned equidistantly from the magnet's center and either 90 degrees from each other if two sensors are utilized, or 120 degrees from each other if three Hall effect sensors are utilized. The position sensor assemblies described herein may be utilized on a motor shaft, however alternate applications are within the scope of these position sensor assemblies. Tests done on this position sensor assembly have shown improvements in resolution capability versus the prior art, which, for example, may have limited resolution capability of 2.5 mechanical degrees for a sensor assembly having 72 pole high resolution and 6 pole low resolution magnets. Thus, a simple, low-cost motor position sensor having high resolution has been described.

While the invention has been described with reference to an exemplary embodiment, it will be understood by those skilled in the art that various changes may be made and equivalents may be substituted for elements thereof without departing from the scope of the invention. Terms such as "first" and "second" are used herein merely to distinguish between two like elements, and are not intended to imply an order such as of importance or location. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A position sensor assembly comprising:
   a rhombus-shaped magnet; and
   at least one magnetic flux density sensor, wherein rotation of the rhombus-shaped magnet is detected by the at least one magnetic flux density sensor,
   wherein the at least one magnetic flux density sensor includes three Hall sensors A, B, and C positioned 120 degrees apart from each other about a circular pattern circumscribed around the rhombus-shaped magnet, and wherein position information is extracted by measuring output signals V from the Hall sensors A, B, C, and employing the following algorithm to determine position $\theta$ at different intervals:

| Position Extraction Algorithm | | | | |
|---|---|---|---|---|
| Range | A | B | C | $\theta$ (deg) |
| 0-60 | + | − | + | $\dfrac{60 V_A}{V_C + V_A}$ |
| 60-120 | + | − | − | $\dfrac{60(V_B + 2V_C)}{V_B + V_C}$ |
| 120-180 | + | + | − | $\dfrac{60(2V_A + 3V_B)}{V_A + V_B}$ |
| 180-240 | − | + | − | $\dfrac{60(3V_C + 4V_A)}{V_C + V_A}$ |
| 240-300 | − | + | + | $\dfrac{60(4V_B + 5V_C)}{V_B + V_C}$ |
| 300-360 | − | − | + | $\dfrac{60(5V_A + 6V_B)}{V_A + V_B}$ |

2. The position sensor assembly of claim 1 wherein, within every 60 degree interval of the circular pattern, an absolute value of a redundant signal from one of the three Hall sensors that is not used for position estimation is greater than or equal to a summation of an absolute value of working signals Hall sensors that are used for position measurement.

3. The position sensor assembly of claim 1 wherein the rhombus-shaped magnet is magnetized through its major axis.

4. The position sensor assembly of claim 1 further comprising a circuit board holding the at least one magnetic flux density sensor.

5. The position sensor assembly of claim 1 further comprising a circular magnetic shield surrounding the rhombus-shaped magnet.

6. The position sensor assembly of claim 1 wherein the rhombus-shaped magnet is rotatable coaxially with a motor shaft.

7. A motor position sensor assembly comprising:
   a rotor shaft of a motor, the shaft having a longitudinal axis;
   a rhombus-shaped magnet positioned coaxially with the longitudinal axis of the shaft, wherein the rhombus-shaped magnet is rotatable with the shaft; and,
   at least one magnetic flux density sensor, wherein rotation of the rhombus-shaped magnet is detected by the at least one magnetic flux density sensor,
   wherein the at least one magnetic flux density sensor includes three Hall sensors A, B, and C positioned 120 degrees apart from each other about a circular pattern circumscribed around the rhombus-shaped magnet, and wherein rotor shaft position information is extracted by measuring output signals V from the Hall sensors A, B, C, and employing the following algorithm to determine position $\theta$ at different intervals:

| Rotor Position Extraction Algorithm | | | | |
|---|---|---|---|---|
| Range | A | B | C | θ (deg) |
| 0-60 | + | − | + | $\dfrac{60 V_A}{V_C + V_A}$ |
| 60-120 | + | − | − | $\dfrac{60(V_B + 2V_C)}{V_B + V_C}$ |
| 120-180 | + | − | − | $\dfrac{60(2V_A + 3V_B)}{V_A + V_B}$ |
| 180-240 | + | + | − | $\dfrac{60(3V_C + 4V_A)}{V_C + V_A}$ |
| 240-300 | − | + | + | $\dfrac{60(4V_B + 5V_C)}{V_B + V_C}$ |
| 300-360 | − | − | + | $\dfrac{60(5V_A + 6V_B)}{V_A + V_B}$ |

8. The motor position sensor assembly of claim 7 wherein the rhombus-shaped magnet is magnetized through its major axis.

9. The motor position sensor assembly of claim 7 wherein, within every 60 degree interval of the circular pattern, an absolute value of a redundant signal from one of the three Hall sensors that is not used for position estimation is greater than or equal to a summation of an absolute value of working signals Hall sensors that are used for position measurement.

10. The motor position sensor assembly of claim 7 further comprising a circular magnetic shield surrounding the rhombus-shaped magnet, the circular magnetic shield positioned on a circuit board holding the at least one magnetic flux density sensor.

11. The motor position sensor assembly of claim 7 further comprising a support surrounding an end of the shaft and for holding the rhombus-shaped magnet to the shaft.

12. The motor position sensor assembly of claim 11 wherein the support includes a cup shaped portion for holding the rhombus-shaped magnet, wherein the at least one magnetic flux density sensor is located exteriorly of the cup shaped portion.

* * * * *